Sept. 24, 1957
J. C. BEAUMONT ET AL
2,807,335
HYDRAULIC BRAKE
Filed Jan. 25, 1956
3 Sheets-Sheet 1
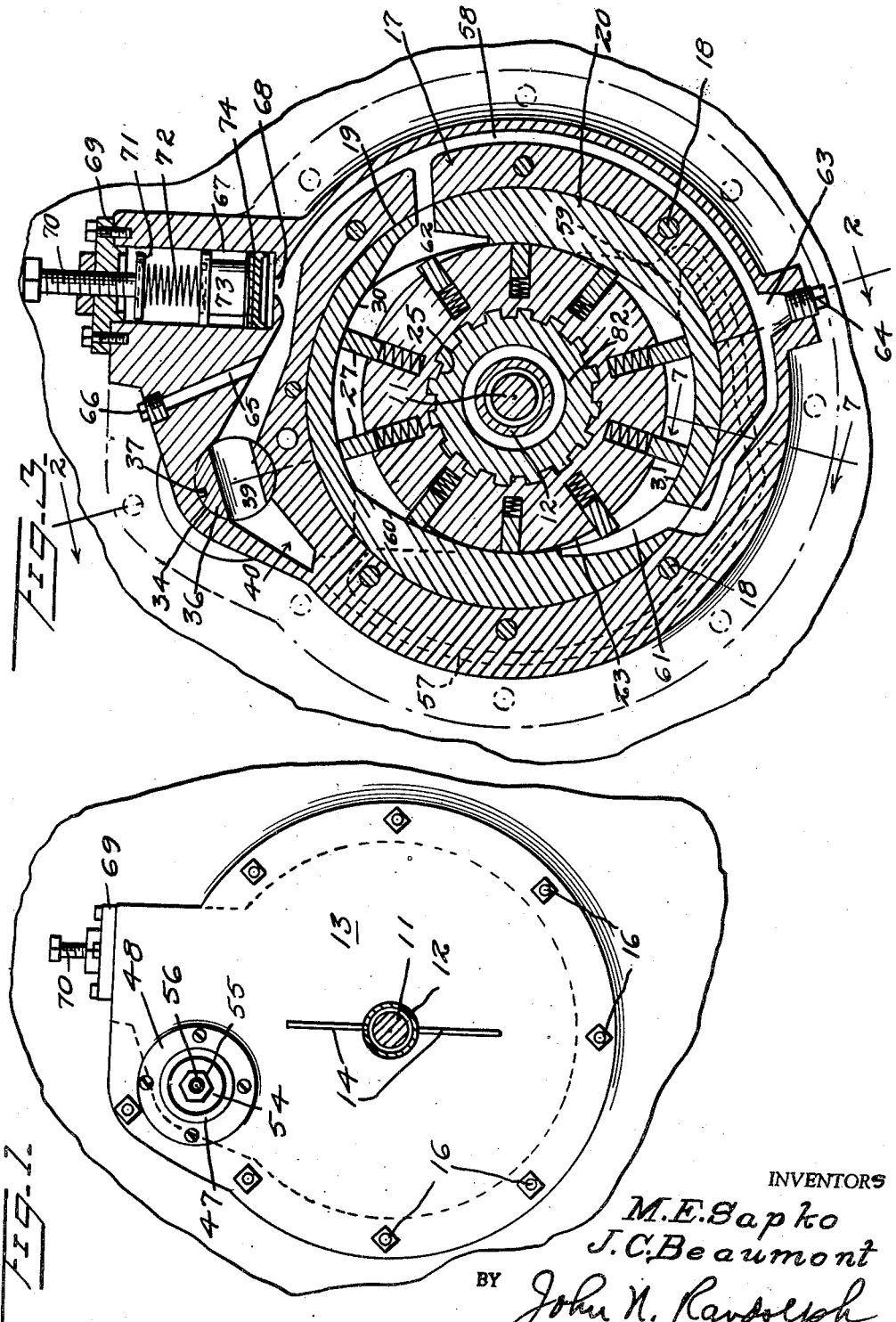
INVENTORS
M. E. Sapko
J. C. Beaumont
BY John N. Randolph
ATTORNEY Sept. 24, 1957 J. C. BEAUMONT ET AL 2,807,335
HYDRAULIC BRAKE
Filed Jan. 25, 1956 3 Sheets-Sheet 2
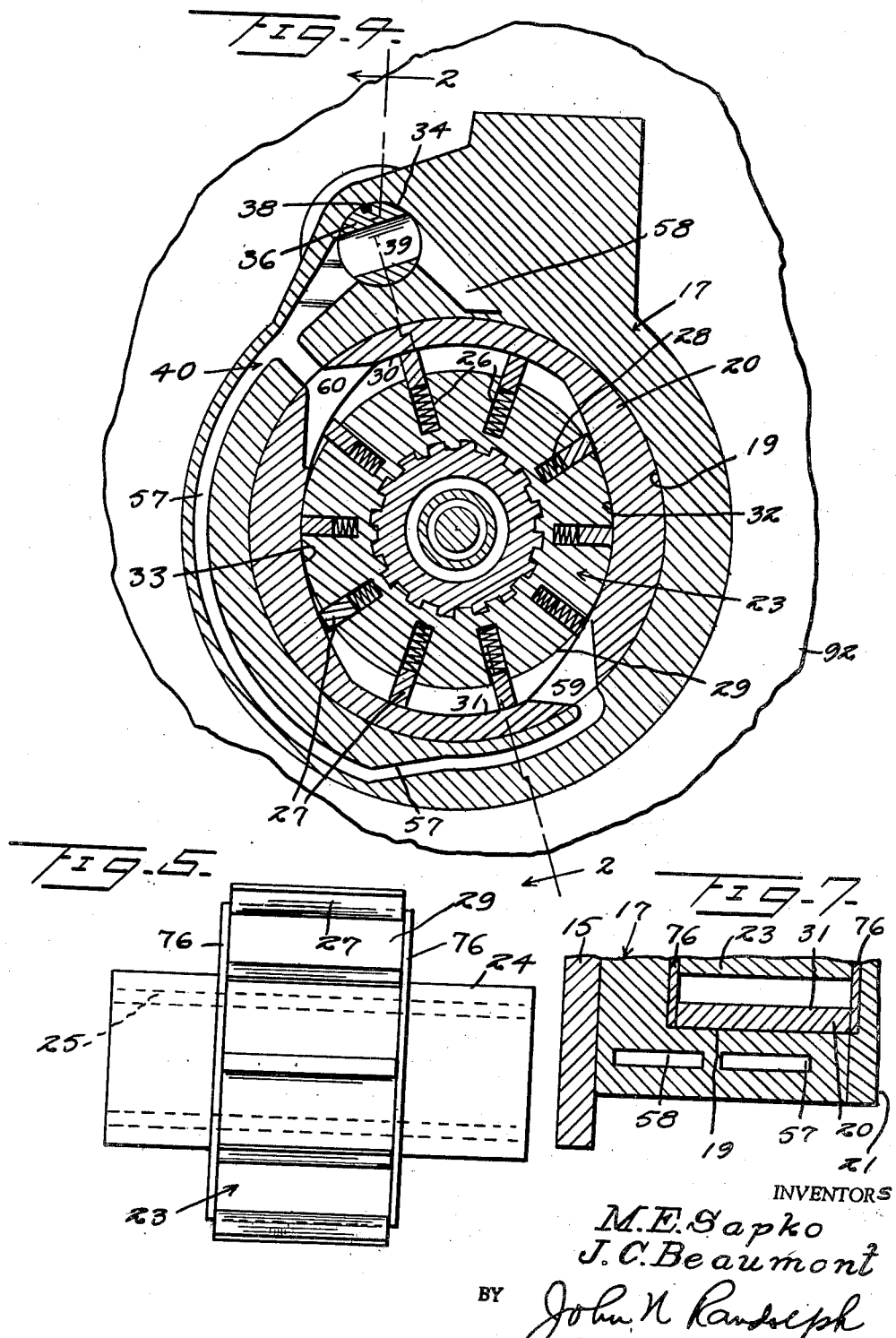
INVENTORS
M. E. Sapko
J. C. Beaumont
BY John N. Randolph
ATTORNEY Sept. 24, 1957
J. C. BEAUMONT ET AL
2,807,335
HYDRAULIC BRAKE
Filed Jan. 25, 1956
3 Sheets-Sheet 3
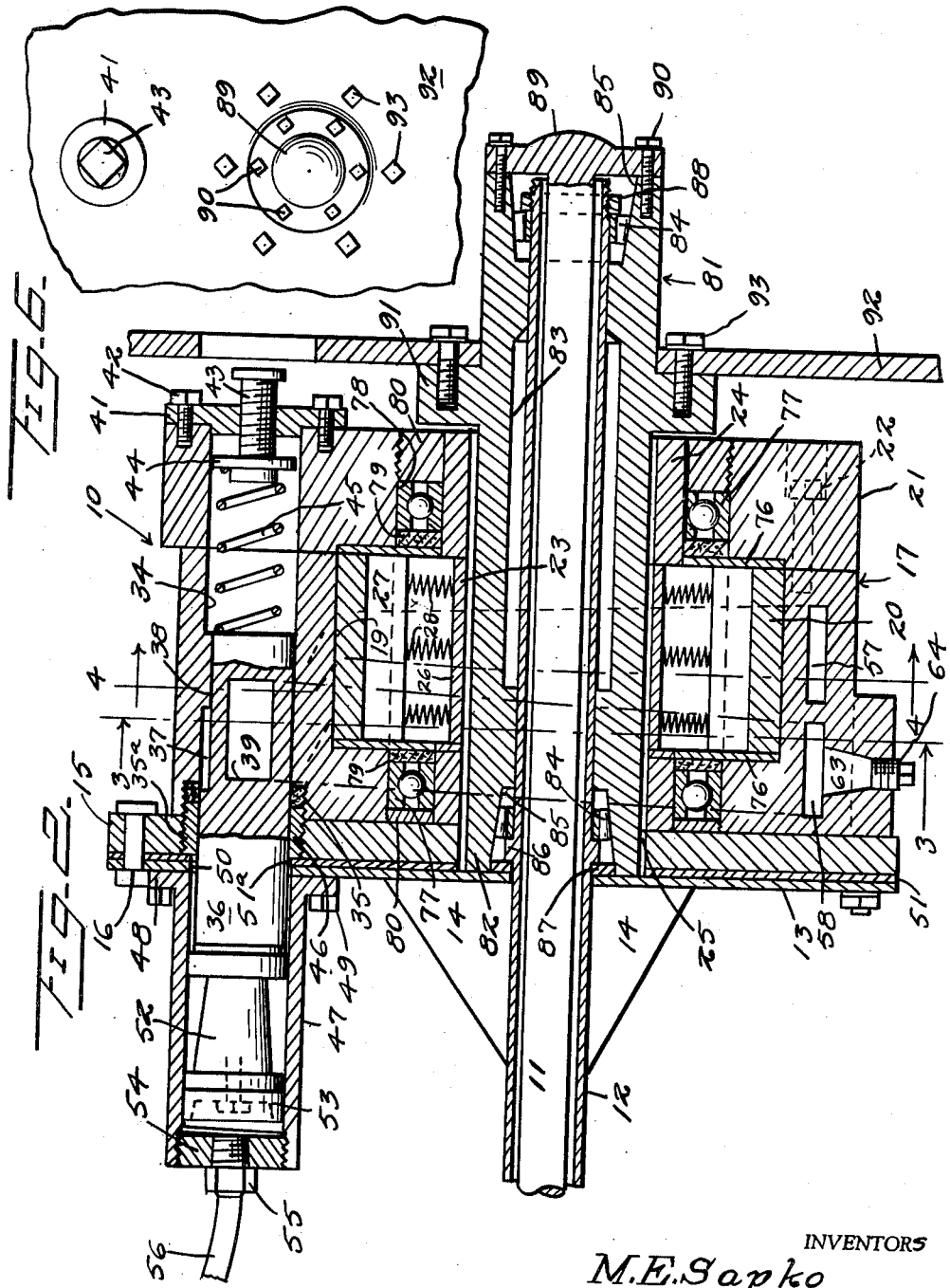
INVENTORS
M. E. Sapko
J. C. Beaumont
BY John N. Randolph
ATTORNEY

United States Patent Office 2,807,335
Patented Sept. 24, 1957

2,807,335

HYDRAULIC BRAKE

John C. Beaumont and Michael E. Sapko,
Belle Vernon, Pa.

Application January 25, 1956, Serial No. 561,230

7 Claims. (Cl. 188—90)

This invention relates to a novel hydraulic brake for motor vehicles primarily but which may additionally be utilized on other types of machines where a braking, stopping or retarding action for a rotary moving part is required.

More particularly, it is an aim of the present invention to provide a hydraulic brake of simple construction which will be dependable and safe in operation and which will require a minimum of power to effect the braking action thereof.

Still another object of the invention is to provide a hydraulic brake having a minimum number of moving parts which are subject to wear, and all of which moving parts and the parts contacted thereby are capable of being replaced individually when worn out.

Various other objects and advantages of the invention will hereinafter become more fully apparent from the following description of the drawings, illustrating a presently preferred embodiment thereof, and wherein:

Figure 1 is an elevational view looking toward the inner side of the brake, from left to right of Figure 2;

Figure 2 is a longitudinal sectional view of the brake, on an enlarged scale relative to Figure 1, and taken substantially along a plane as indicated by the line 2—2 of Figure 3;

Figures 3 and 4 are cross sectional views of the brake, taken substantially along planes as indicated by the lines 3—3 and 4—4, respectively, of Figure 2;

Figure 5 is an elevational view of the brake rotor shown removed;

Figure 6 is a fragmentary end elevational view, looking from right to left of Figure 2, and Figure 7 is a fragmentary sectional view, taken substantially along a plane as indicated by the line 7—7 of Figure 3.

Referring more specifically to the drawings, the novel hydraulic brake in its entirety and comprising the invention is designated generally 10. For the purpose of illustrating one application and use of the brake 10, said brake is shown in the drawings mounted on a wheel axle housing. However, as the description proceeds it will be apparent that the brake 10 may be utilized in other locations where a part of the brake may be fixedly supported and another part thereof connected to a rotary driven part to which a braking action is to be applied. As illustrated in the drawings, a wheel axle 11 is shown disposed for rotation in an axle housing 12. Said axle housing is provided with a mounting flange 13 which is spaced from an outer end thereof and which is braced relative to the axle housing by webs 14.

The brake 10 includes an annular mounting plate 15 which is loosely disposed around a portion of the axle housing 12 and which is secured to an outer side of the mounting flange 13 by nut and bolt or similar fastenings 16. An annular brake housing, designated generally 17, has one end thereof disposed against the other side of the mounting plate 15 and secured thereto by suitable fastenings 18, as seen in Figure 3.

The housing 17 is provided with an annular inwardly opening chamber 19 in which a cam ring 20 is detachably but nonrotatably disposed. The cam ring 20 provides a liner for the outer portion of the chamber 19. As seen in Figure 2, the outer end of the housing 17, which is located remote from the mounting plate 15, is formed by a detachable section 21 of said housing, in which a portion of the chamber 19 is formed. The detachable section 21 is secured to the remainder of the housing 17 by suitable fastenings 22 (Figure 2).

A rotor 23 is mounted for rotation in the cam ring 20 and is provided with an integral hub 24 which extends from the ends thereof. It will be understood that the cam ring 20 and rotor 23 are applied to the housing chamber 19 while the housing section 21 is detached. The rotor 23 and its hub 24 has a splined bore 25 which extends longitudinally therethrough. The rotor 23 is provided with a series of circumferentially spaced radially extending slots 26 in which vanes 27 are supported for radial sliding movement. Springs 28 are contained in the slots 26, behind the vanes 27, for urging said vanes outwardly with respect to the periphery 29 of the rotor which is concentrically disposed around the axis of said rotor.

The cam ring or liner 20, as best seen in Figures 3 and 4, includes a bore or inner periphery having substantially oppositely disposed eccentric bore segments 30 and 31 which are spaced outwardly from contiguous portions of the rotor periphery 29 and oppositely disposed cylindrical segment portions 32 and 33, which are located nearer the axis of the cam ring 20 than said eccentric segment portions 30 and 31 and which are disposed between said portions 30 and 31. Portions of the periphery 29 of the rotor contact said cylindrical segment portions 33. It will be understood that the outer edges of the vanes 27 have wiping engagement with the surfaces 30, 31, 32 and 33 of the bore of the cam ring 20 and that said vanes 27 are displaced inwardly of the slots 26 by contact with the surfaces 32 and 33 and are urged outwardly into engagement with the surfaces 31 and 32 by the springs 28, so that each vane 27 moves radially inward and outward of the rotor 23 twice during each revolution of the rotor.

As best seen in Figure 2, the upper portion of the brake housing 17 is provided with a bore 34 which extends longitudinally therethrough and which is provided with an enlarged threaded end 35, a threaded continuation 35a of which is formed in the mounting plate 15. An elongated valve body 36 is slidably disposed in the bore 34 and is provided with a longitudinally extending groove 37 which engages a spline or key 38. The spline or key 38 constitutes a part of the housing 17 and extends into the bore 34 to prevent rotation of the valve 36 therein. The valve 36 is provided with an opening 39 which extends transversely therethrough and which registers with a passage 40, formed in the brake housing 17, in the normal open position of the valve 36, as illustrated in Figures 2 and 3. A cap 41 is secured to the outer side or end of the housing section 21 by fastenings 42 and closes the other end of the bore 34. A screw 43 is threaded through the cap 41 and has its inner end engaging against a spring seat 44. One end of an expansion coiled spring 45 bears against the other side of the spring seat 44 and the other end of said spring bears against the inner end of the valve 36. The valve 36 extends slidably through a stuffing box 46 which is mounted in the threaded bore portions 35 and 35a.

A cylinder 47 has a flanged end 48 which is secured by fastenings 49 to the mounting flange 13 on the inner exposed side thereof and so that the bore of the cylinder 47 will align with an opening 50 of the flange 13, which aligns with the bore 34. A gasket 51 may be mounted between the flange 13 and plate 15, and if provided will have an opening 51a, registering with the opening 50. The cylinder 47 contains a piston 52 which is provided with a conventional cup seal 53 at the outer end thereof to prevent a medium under pressure escaping past the piston 52 from left to right, as seen in Figure 2. The outer end of the valve 36 extends into the cylinder 47 and bears against the inner end of the piston 52. The other outer end of the cylinder 47 is closed by a plug 54 which is threadedly mounted therein and through which is tapped a nipple 55 which connects the bore of the cylinder to an end of a conduit 56. The conduit 56 may constitute a conventional line leading from a conventional hydraulic master brake cylinder as is conventionally used for motor vehicles and by which a hydraulic medium under pressure is supplied to vehicle brakes. Also, the line 56 may lead from a compressed air source.

The passage 40 includes end portions 57 and 58 which extend in opposite directions from the bore 34 and which are offset from one another, as seen in Figure 2, so that portions of said passage ends may cross, as illustrated in Figure 3. The passage end 57 has a flared terminal portion 59 which is formed in the cam ring 20 and which opens into an end of the eccentric or recessed surface 31, as best seen in Figure 4. Said passage 57 is also provided with a branch portion having a flared end 60 which opens into an end of the eccentric surface 30 and which is disposed substantially opposite to the flared passage end terminal 59. Similarly, the passage 59 is provided with a terminal 61 which is also flared and which opens into the other end of the eccentric surface 31. The passage 59 has a branch provided with a flared end 62, which is disposed substantially opposite the terminal 61 and which opens through the other end of the surface 30.

One of the passage ends, for example the passage end 58, is provided with a drain port and sediment trap 63 which extends downwardly from a lower part thereof and which opens outwardly of the bottom of the housing 17, as seen in Figure 3. Said sediment trap is normally closed by a threaded plug 64. A filling port 65 is formed in the upper part of the housing 17 and opens downwardly into an upper part of the passage end 58. The outwardly opening upper end of the port 65 is likewise normally closed by a threaded plug 66.

The upper part of the housing 17 is also provided with a cylinder 67 the inner end of which is connected by a restricted port 68 with a part of the passage end 58. The open outer end of the cylinder 67 is closed by a cap 69 having a screw 70 threaded inwardly therethrough and which adjustably engages against a spring stop 71 contained in the outer portion of the cylinder 67. A spring 72 is disposed between the other side of said spring stop 71 and an inner end of a plunger 73. A neoprene cup seal 74 is secured to the opposite outer end of the plunger 73 and normally bears against the inner end of the cylinder 67, around the port 68.

Annular bushings 76 are mounted in the chamber 19 between the annular end walls thereof and the end walls of the rotor 23, so that said rotor and the vanes 27 thereof only contact said bushings and the cam ring 20. Antifriction bearings 77 are mounted on the hub 24 beyond the ends of the rotor 23 and are disposed between said hub and the bore 78 of the housing 17. Annular seals or gaskets 79 are disposed on the hub 24 between the bearings 77 and the bushings 76. Collars 80 which fit loosely around the ends of the hub 24 are threaded into the ends of the bore 78 to retain the bearings 77 in position.

A wheel hub 81 has an externally splined end portion 82 which fits the splined bore 25 of the rotor 23 and hub 24 to form a driving connection between the hub and rotor. The axle housing 12 extends substantially through the bore 83 of the wheel hub 81 and said wheel hub is journalled on the axle housing 12 by tapered antifriction bearings 84 which engage around portions of said axle housing and against inwardly tapered end portions 85 of the bore 83. The axle housing 12 has a fixed collar 86 which engages the inner bearing 84 to prevent movement of said bearing away from the restricted end of the bore portion 85 engaged thereby. A dust and dirt seal 87 is mounted around the axle housing 12 between the collar 86 and the flange 13. A nut 88 is threaded onto the outer end of the axle housing 12 and against the other antifriction bearing 84 to prevent said last mentioned bearing from moving toward the enlarged end of the bore portion 85 engaged thereby. The axle 11 has a head 89 at its outer end which is disposed beyond the outer end of the axle housing 12 and which is secured to the outer end of the wheel hub 81 by fastenings 90 to cause said wheel hub to revolve with the axle. The wheel hub 81 has a flange or collar 91 disposed therearound and located beyond the outer end of the brake 10, to the outer side of which a wheel 92 is secured by fastenings 93. Only the inner portion of the wheel 92 has been illustrated and it is to be understood that any conventional single or dual vehicle wheel may be mounted on and secured to the wheel hub 81.

The system of the brake 10 is filled with a suitable hydraulic fluid through its filling port 65 so that the passage 40, the valve passage 39 and the spaces between the surfaces 30 and 31 and the rotor 23 will be filled with the hydraulic fluid. The spring 45 normally maintains the valve passage 39 in full alignment with the passage 40 so as not to impede the flow between the passage ends 57 and 58.

Assuming that the axle 11, wheel 92, wheel hub 81 and rotor 23 are revolving counterclockwise, as seen in Figures 3 and 4, during each revolution of the rotor each vane 27 thereof will propel a part of the hydraulic fluid in advance of it from the flared port 62 to the flared port 60 and either thereafter or prior thereto will in a like manner propel a part of the hydraulic fluid from the port 61 to the port 59. The hydraulic fluid will be crowded into restricted areas in approaching the ports 59 and 60 and will be forced under pressure from said ports into the passage end 57 from whence the liquid will flow through the valve port 39 into the passage end 58 to replace the liquid which has been drawn into the spaces between the rotor and the surfaces 30 and 31 through the ports 61 and 62 by the vanes 27. So long as the valve port 39 is in full registration with the passage 40, this movement of the hydraulic liquid will not to any appreciable extent retard rotation of the rotor 23 and thus will not retard rotation of the axle 11 and wheel 92. It will also be readily apparent that the brake can similarly function with the rotor revolving in the other direction or clockwise as seen in Figure 4, in which case the hydraulic liquid will be drawn from the passage 57 through the ports 59 and 60 thereof and will be forced into the passage 58 through its ports 61 and 62, and the liquid will flow from the passage 58 through the valve port 39 into the passage 57, likewise without retarding rotation of the rotor to any appreciable extent so long as the port 39 is in full registration with the passage 40.

To apply the brake 10, pressure is supplied to the outer end of the cylinder 47 through the line 56 in any conventional manner to cause movement of the piston 52 from left to right, as seen in Figure 2, so that the piston will displace the valve 36 from left to right against the spring 45 to move the port 39 thereof out of a position in full registration with the passage 40, so as to retard the flow of the hydraulic fluid between the passage ends 57 and 58. This will cause the hydraulic fluid to act against the vanes 27 to retard rotation of the rotor 23, which braking or retarding force is transmitted from said rotor to the wheel hub 81 and from the wheel hub to the wheel 92 and axle 11 to retard the rotation of said parts in either direction. Obviously, the extent of the braking force thus applied will vary depending upon the extent that the port 39 is moved out of full registration with the passage 40 and if moved completely out of communication with the passage 40, rotation of the rotor, wheel hub, wheel and axle will be completely prevented.

The cylinder 67 and its spring pressed plunger 73 is provided merely as a safeguard in the event that a low grade hydraulic fluid is employed and which might expand due to heat, so that the plunger 73 may yield away from the port 68 to compensate for such expansion. Where a good grade of hydraulic fluid which is not subject to expansion is employed, the cylinder 67 and the parts associated therewith may be omitted.

Various modifications and changes are contemplated and may obviously be resorted to, without departing from the function or scope of the invention as hereinafter defined by the appended claims.

We claim as our invention:

1. A hydraulic brake comprising a fixed brake housing having a bore extending therethrough and an annular recess opening inwardly into said bore, a rotor rotatably mounted in said recess, a plurality of circumferentially spaced vanes mounted for radial sliding movement in said rotor, means urging said vanes to projected positions outwardly with respect to the rotor periphery, said housing recess having a periphery including substantially oppositely disposed cylindrical segments engaged by portions of the rotor periphery and substantially oppositely disposed eccentric portions spaced outwardly from said rotor periphery and combining with portions of the rotor to form arcuate chambers into which said vanes are radially projected and along which said vanes travel circumferentially from end-to-end of said chambers, said housing having a passage formed therein around the rotor accommodating recess thereof including end portions having terminal parts opening into the ends of one of said arcuate chambers, said end portions of the passage having branch portions opening into the ends of the outer arcuate chamber, the branch portions of said passage ends being disposed substantially opposite to the terminal parts thereof whereby each passage end communicates with complementary ends of the two arcuate chambers, a valve movably disposed in said housing and having a port formed therein and disposed in full registration with said passage, in a fully open position of the valve, and interposed between and connecting said passage ends, said passage, the valve port and said arcuate chambers defining a closed system filled with a hydraulic fluid, means for actuating said valve for moving the port thereof out of full registration with said passage for restricting the flow of the hydraulic fluid therethrough between said passage ends for retarding movement of the hydraulic fluid through said arcuate chambers between the ports of the two passage ends for retarding rotation of said rotor, and means connecting said rotor to a rotary driven part for applying a braking action to said rotary driven part when the valve port is moved out of full registration with the passage.

2. A brake as in claim 1, said rotor having a hub including portions extending from the ends of the rotor, an antifriction bearing means interposed between the hub ends and portions of the bore of the housing for journalling said hub and rotor in the housing.

3. A brake as in claim 2, a cam ring detachably mounted in said housing recess having an inner surface defining the periphery of the recess and through portions of which said passage ports open, and bushings disposed between end walls of said housing recess and the ends of said rotor and combining with said cam ring for completely lining the housing recess.

4. A brake as in claim 1, said rotor having a hub including portions extending from the ends of the rotor, an antifriction bearing means interposed between the hub ends and portions of the bore of the housing for journalling said hub and rotor in the housing, said hub having a splined bore extending longitudinally therethrough, a wheel hub having a splined end extending through said bore and splined to the hub for rotation of the hub and rotor in unison with said wheel hub, and means for securing an outer end of said wheel hub to an outer end of an axle beyond an outer end of a housing of the axle, said last mentioned means and the wheel hub constituting said means for connecting the rotor to a rotatably driven part as constituted by said axle.

5. A brake as in claim 4, said wheel hub having a bore extending longitudinally therethrough in which the axle housing is accommodated, and antifriction bearings contained in portions of said wheel hub bore for journalling the wheel hub on the axle housing.

6. A brake as in claim 1, means slidably and non-turnably mounting said valve in the housing, spring means urging said valve in one direction toward a fully open position, and means actuated in response to a medium under pressure for moving the valve in the opposite direction toward a closed position thereof, said spring means and pressure responsive means constituting said valve actuating means.

7. A brake as in claim 1, said passage including an expansion chamber formed in said housing to compensate for expansion of the hydraulic medium.

References Cited in the file of this patent
UNITED STATES PATENTS

| | | |
|---|---|---|
| 1,008,201 | Schmucker | Nov. 7, 1911 |
| 1,409,548 | Imhoff et al. | Mar. 14, 1922 |
| 1,735,529 | Dey | Nov. 12, 1929 |
| 2,124,173 | Wood | July 19, 1938 |
| 2,208,074 | Holz | July 16, 1940 |
| 2,529,160 | Johnson et al. | Nov. 7, 1950 |